No. 745,773. PATENTED DEC. 1, 1903.
B. BORDEN.
CLUTCH OR WORK HOLDER FOR PIPE THREADING MACHINES.
APPLICATION FILED MAR. 10, 1903.
NO MODEL.
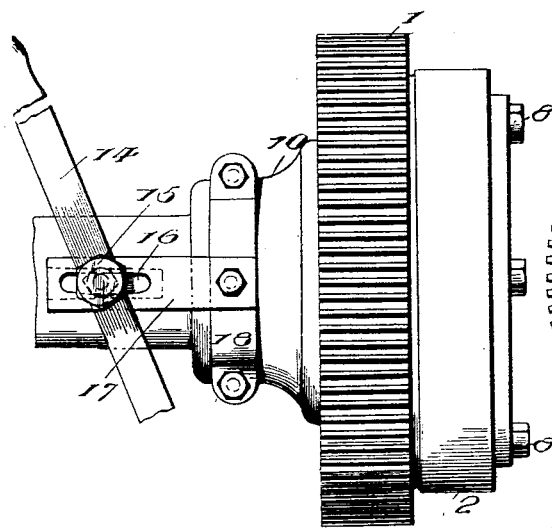
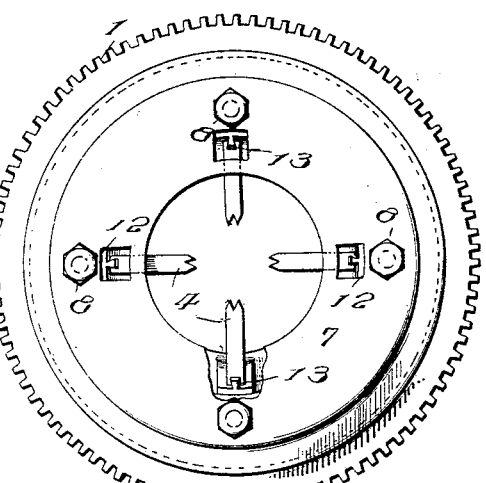
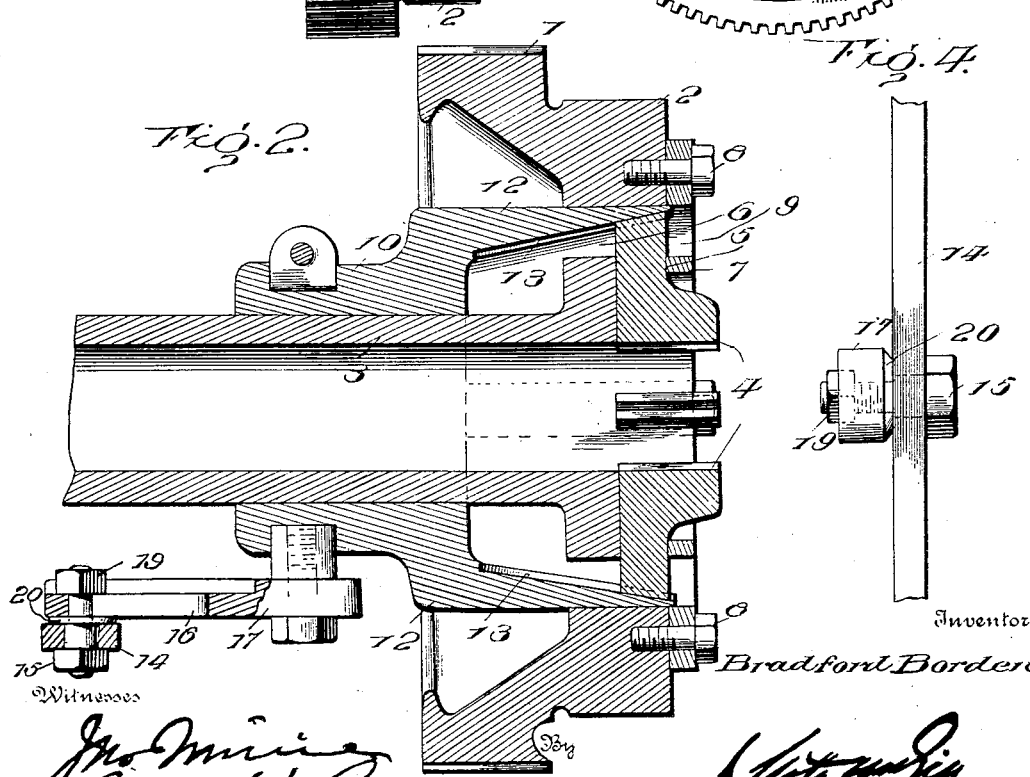
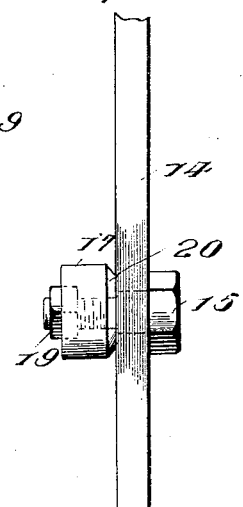
Inventor
Bradford Borden
Witnesses
Attorney No. 745,773. Patented December 1, 1903.

UNITED STATES PATENT OFFICE.

BRADFORD BORDEN, OF WARREN, OHIO, ASSIGNOR TO FRANK S. CHRYST, TRUSTEE, OF WARREN, OHIO.

CHUCK OR WORK-HOLDER FOR PIPE-THREADING MACHINES.

SPECIFICATION forming part of Letters Patent No. 745,773, dated December 1, 1903.

Application filed March 10, 1903. Serial No. 147,056. (No model.)

*To all whom it may concern:*

Be it known that I, BRADFORD BORDEN, of Warren, in the county of Trumbull and State of Ohio, have invented certain new and useful Improvements in Chucks or Work-Holders for Pipe-Threading Machines; and I do hereby declare the following to be a full, clear, and exact description of the invention, such as will enable others skilled in the art to which it appertains to make and use the same.

The object of this invention is to provide a chuck or work-holder for power pipe-threading machines, into which the pipes may be readily inserted and removed and changes made of pipes of different sizes within the range of the chuck without stopping the operation of the machine, and further objects are to provide a chuck of this character which shall be composed of but few parts, be efficient in operation, strong and durable, insure a firm hold on the pipe during the threading operation, and allow of the ready and easy replacement of a damaged jaw.

The invention will be hereinafter fully set forth, and particularly pointed out in the claims.

In the accompanying drawings, Figure 1 is a side elevation. Fig. 2 is a longitudinal sectional view. Fig. 3 is a face view. Fig. 4 is a detail.

Referring to the drawings, 1 designates a gear-wheel of a power-driven threading-machine, such wheel having a hub 2, preferably formed integral with or rigidly secured to the end of a tubular portion or hollow shaft 3, wherein is designed to be located a pipe to be threaded. The periphery of the hub is in practice held in a bearing (not shown) wherein it revolves under the action of gearing in mesh with wheel 1.

4 4 designate jaws transversely movable within the hub 2, the inner ends of said jaws being designed to project into the axial center of the shaft for gripping and holding a pipe therein. These jaws are preferably four in number and are extended through openings 5, arranged transversely of the hub at the end of the shaft, being formed by cut-outs in such end. The outer ends of the jaws—that is, those ends toward the periphery of the hub—extend into intersecting openings 6, parallel- ing the wheel-axis, the walls of such latter openings being slightly curved concentrically to the shaft. The jaws are retained within the openings 5 by a face-plate 7, removably secured by screws 8 to the outer face of the wheel-hub, such face-plate having openings 9 therein coincident with the openings 6.

10 designates the chuck-collar, loosely mounted on shaft 3 and having a series of arms 12, designed to project through openings 6 with their ends in the coincident openings of the face-plate, the outer surfaces of such arms conforming to the contours of such openings. The inner faces of these arms are beveled, as are also the outer ends of the jaws, and the connections between them are formed by dovetailed flanges 13 of the arms fitting corresponding sockets in the ends of the jaws.

14 is a lever for shifting the chuck-collar longitudinally of the shaft. This lever carries a nutted bolt 15, having an enlarged diameter fitting loose in an opening in the lever, the threaded portion of the bolt being projected through a slot 16, running longitudinally of a link 17, secured to a band 18, encircling the collar. The link is recessed on one face to accommodate the nut 19, so that the bolt may be loosened or tightened from the side of the machine. A washer 20 between the link and the shoulder formed by the enlarged portion of the bolt permits the former to be held tight, while the lever is free to turn on the bolt. By this means the collar may be independently adjusted when changing from large to small or from small to large pipes, obviating the necessity of changing the position of the lever for different-sized pipes to insure contact of the jaws with the pipe to be threaded.

When a pipe is positioned within the tubular shaft, the chuck-collar is moved on the latter toward the gear-wheel, so that its wedging-arms will be projected through the openings in the hub and face-plate with the result that the several jaws will be simultaneously forced inwardly toward the axial center of the shaft and effect the binding of the pipe. As is well understood in the art, the threading is effected by a stationary die while the pipe is rotated by the chuck. When the thread is formed, the collar is moved outwardly, thereby drawing the jaws laterally away from the pipe and releasing the hold thereon, permitting it to be removed from within the shaft without stopping the operation of the machine.

The advantages of my invention are apparent to those skilled in the art.

It will be seen that I have constructed a chuck composed of very few parts and by means whereof the binding and releasing of a pipe at the axial center thereof during the operation of the machine may be readily and easily accomplished. In the event of damage to any of the jaws a new one may be substituted by removing the face-plate, thereby allowing such jaw to be drawn outwardly through the uncovered openings in the end of the shaft or hub of the wheel, such plate being restored after a new jaw is inserted in place.

The chuck is readily adaptable for constant use with pipes of various sizes, ranging usually from one-half inch to two inches in diameter. To thus change from maximum to minimum sizes or the reverse, it is only necessary to loosen the nut of the adjusting-lever and slide the collar into the desired position. All this may be done without stopping the operation of the machine. Hence I have the advantage of quick changing of the machine to thread from any one size pipe to another.

I claim as my invention—

1. A work-holder for a power pipe-threading machine comprising a constantly-rotated wheel having an axial opening, a series of transversely-movable jaws, a collar concentric to such wheel and capable of being moved at right angles thereto for moving the jaws toward and away from the axial center of the wheel, and means mounted independently of the wheel for actuating the collar while the machine is in operation.

2. A work-holder for a power pipe-threading machine comprising a constantly-rotated wheel having a central tubular portion, a series of transversely-movable jaws, a sliding collar concentric to such wheel mounted on said tubular portion for moving said jaws toward and away from the axial center of such tubular portion, and means mounted independently of the wheel for actuating the collar while the machine is in operation, as set forth.

3. A work-holder for a power pipe-threading machine comprising a constantly-rotated wheel having a central tubular portion, a series of transversely-movable jaws, a sliding collar concentric to said wheel and movable at right angles thereto on said tubular portion, said collar having a series of wedging-fingers designed to engage such jaws to force them inwardly, means for withdrawing the jaws when the collar is retracted, and means for actuating such collar, as set forth.

4. A work-holder for a power pipe-threading machine comprising a constantly-rotated wheel having a central tubular portion, a series of transversely-movable jaws beveled on their outer ends, a sliding collar concentric to said wheel and movable at right angles thereto on said tubular portion, said collar having fingers beveled on their inner faces to conform to the outer ends of said jaws, means for withdrawing the latter when the collar is retracted, and means mounted independently of the wheel and tubular portion for actuating said collar, as set forth.

5. A work-holder for a power pipe-threading machine comprising a constantly-rotated wheel having a central tubular portion and a series of transverse openings, jaws movable at right angles to such openings extending into such tubular portion, said jaws being beveled on their outer ends, a face-plate removably secured to the wheel for retaining the jaws in position, a sliding collar concentric to said wheel mounted on said tubular portion and having fingers extended through such openings, which fingers are beveled on their inner faces to conform to the beveled ends of the jaws, tongue-and-groove connections between said fingers and jaws, and means mounted independently of the wheel and tubular portion for actuating said collar, as set forth.

6. A work-holder for a power pipe-threading machine comprising a constantly-rotated wheel having a central tubular portion, a series of transversely-movable jaws, a sliding collar concentric with such wheel and movable at right angles thereto on said tubular portion, said collar having a series of fingers for engaging said jaws to move them toward and away from the axial center of the wheel, means mounted independently of the wheel and tubular portion for actuating the collar while the machine is in operation, and adjustable means for regulating the position of such collar relatively to the operating means, as set forth.

7. A chuck for a pipe-threading machine comprising a gear-wheel having a hub and central tubular portion, such hub having two sets of communicating openings, one set of which opens into said tubular portion, jaws in said latter openings having their outer ends beveled and socketed, and a sliding collar mounted on said tubular portion having beveled fingers extended through one set of openings for engaging said jaws, said fingers having flanges fitting the sockets of the jaws, substantially as set forth.

8. A chuck for a pipe-threading machine comprising a gear-wheel having a hub and central tubular portion, such hub having openings extended therethrough, a series of jaws carried by the hub extended into said openings and having their inner ends beveled, a collar on said tubular portion having fingers extended into said openings beveled to conform to the bevel of said jaws, an operating-lever, a link secured to said collar, and an adjustable connection between said link and lever, substantially as set forth.

9. A chuck for a pipe-threading machine comprising a gear-wheel having a hub and central tubular portion, such hub having openings extended therethrough, a series of jaws carried by the hub extended into said openings and having their inner ends beveled, a collar on said tubular portion having fingers extended into said openings beveled to conform to the bevels of said jaws, an operating-lever, a link secured to said collar, having a longitudinal slot and a recess in one face, a bolt carried by the lever extended through such slot, and a nut on such bolt fitted in said recess, substantially as set forth.

In testimony whereof I have signed this specification in the presence of two subscribing witnesses.

BRADFORD BORDEN.

Witnesses:
FRANK S. CHRYST,
W. A. NERACHER.